(12) United States Patent
Shen et al.

(10) Patent No.: US 11,038,766 B2
(45) Date of Patent: Jun. 15, 2021

(54) SYSTEM AND METHOD FOR DETECTING NETWORK TOPOLOGY

(71) Applicant: Visa International Service Association, San Francisco, CA (US)

(72) Inventors: Yi Shen, Fremont, CA (US); Sangram Pattanaik, Hayward, CA (US); George Moser, Lake Hopatcong, NJ (US)

(73) Assignee: Visa International Service Association, San Francisco, CA (US)

(*) Notice: Subject to any disclaimer, the term of this patent is extended or adjusted under 35 U.S.C. 154(b) by 80 days.

(21) Appl. No.: 16/470,524

(22) PCT Filed: Feb. 3, 2017

(86) PCT No.: PCT/US2017/016547
§ 371 (c)(1),
(2) Date: Jun. 17, 2019

(87) PCT Pub. No.: WO2018/144019
PCT Pub. Date: Aug. 9, 2018

(65) Prior Publication Data
US 2020/0112485 A1    Apr. 9, 2020

(51) Int. Cl.
*H04L 12/24* (2006.01)
*G06Q 20/08* (2012.01)
*H04L 29/12* (2006.01)

(52) U.S. Cl.
CPC .............. *H04L 41/12* (2013.01); *G06Q 20/08* (2013.01); *H04L 41/0893* (2013.01); *H04L 41/145* (2013.01); *H04L 41/147* (2013.01); *H04L 61/2564* (2013.01); *H04L 61/2575* (2013.01)

(58) Field of Classification Search
None
See application file for complete search history.

(56) References Cited

U.S. PATENT DOCUMENTS 6,144,961 A     11/2000  De La
7,512,649 B2 *  3/2009   Faybishenko ........... H04L 63/08
                                                      709/201

(Continued)

OTHER PUBLICATIONS

PCT/US2017/016547, "International Search Report and Written Opinion", dated Nov. 2, 2017, 10 pages.

*Primary Examiner* — Davoud A Zand
(74) *Attorney, Agent, or Firm* — Kilpatrick Townsend & Stockton LLP

(57) ABSTRACT

Described herein are systems, methods, apparatuses, and computer readable media for generating a network topology for a network based on dependencies between network components. Transactions between network components may be monitored in accordance with at least some embodiments. Dependencies may be identified between network applications and/or network devices based on detected transactions detected between those network components. A network topology may then be generated for a network based on the identified dependencies. In some embodiments, the network topology may be used to determine an impact score for one or more network components within the network. An impact score may be used to make determinations with respect to the network.

17 Claims, 6 Drawing Sheets

(56) References Cited

U.S. PATENT DOCUMENTS

| | | | |
|---|---|---|---|
| 9,032,069 B2* | 5/2015 | Van Biljon | G06Q 40/00 |
| | | | 709/224 |
| 10,681,177 B2* | 6/2020 | Tarasenko | H04L 67/10 |
| 2004/0215746 A1 | 10/2004 | Mccanne et al. | |
| 2013/0298192 A1* | 11/2013 | Kumar | G06F 21/52 |
| | | | 726/3 |
| 2013/0298244 A1 | 11/2013 | Kumar et al. | |
| 2015/0055453 A1* | 2/2015 | Chaki | H04L 41/0659 |
| | | | 370/225 |
| 2015/0319256 A1 | 11/2015 | Casey | |
| 2016/0366163 A1 | 12/2016 | Sohn et al. | |
| 2017/0116552 A1* | 4/2017 | Deodhar | G06Q 10/06316 |

* cited by examiner

SYSTEM AND METHOD FOR DETECTING NETWORK TOPOLOGY

CROSS REFERENCE TO RELATED APPLICATIONS

This application is the US national stage of PCT/US2017/016547, filed Feb. 3, 2017, the disclosure of which is incorporated herein by reference in its entirety.

BACKGROUND

Conventional computer Infrastructure (Hosting environment) have numerous network devices (e.g., Router, Switches, Firewalls, Load Balancers, Proxy servers etc.) facilitating communication between Compute Systems (Servers, Storage units, Laptops, Desktops) running numerous applications (e.g., enterprise software). In some cases, a network administrator may want to deactivate a particular network device, because its operation may not appear to be important to the system as a whole. In such cases, the network administrator could deactivate the particular network device, only to find that its deactivation did unexpectedly and adversely affect the system as a whole. As a result, in such systems, there may be a tendency to let all network devices and their applications simply run. This is also problematic, since this can result in wasted energy and resources as well as giving operational challenges to update/maintain different components safely.

Embodiments of the invention address these and other problems, individually and collectively.

BRIEF SUMMARY

Embodiments of the invention are directed to systems, methods, apparatuses, and computer readable media for generating a network topology for a network based on dependencies between network components (network applications and network devices) within the network and the applications/Services running with their contribution. A network topology may comprise a mapping of dependencies between various network components that may be used to determine an impact that an update to a particular network component would have on applications/services running on the network. In some embodiments, dependencies may be identified between network components that frequently communicate. The dependency may also be determined based on a direction of a communication related to the transaction. For example, if Application A frequently sends requests to Device B, then it may be determined that Application A is dependent upon Device B within the network topology. Accordingly, an update made to Device B would also have an impact on Application A.

One embodiment of the invention is directed to a method of generating a network topology comprising receiving, for each device of a plurality of devices involved in a network, an indication of traffic between the device and a plurality of endpoints, mapping each endpoint of the plurality of endpoints to an application of a plurality of applications, each application of the plurality of applications associated with an application impact score, storing information indicating a relationship between each device and one or more applications based on the mappings, generating the network topology based on the stored information, and determining a device impact score for each device of the plurality of devices based on the generated network topology and the application impact scores.

Another embodiment of the invention is directed to a server computer comprising a processor and computer-readable medium coupled to the processor, where the computer-readable medium comprises code, executable by the processor, for performing a method. The method receive, for each device of a plurality of devices involved in a network, an indication of at least one communication between the device and a plurality of endpoints, map each endpoint of the plurality of endpoints to an application of a plurality of applications, each application of the plurality of applications associated with an application impact score, store information indicating a relationship between each device and one or more applications based on the mappings, generate the network topology based on the stored information, and determine a device impact score for each device of the plurality of devices based on the generated network topology and the application impact scores.

These and other embodiments of the invention are described in further detail below.

DETAILED DESCRIPTION

Figure 1:
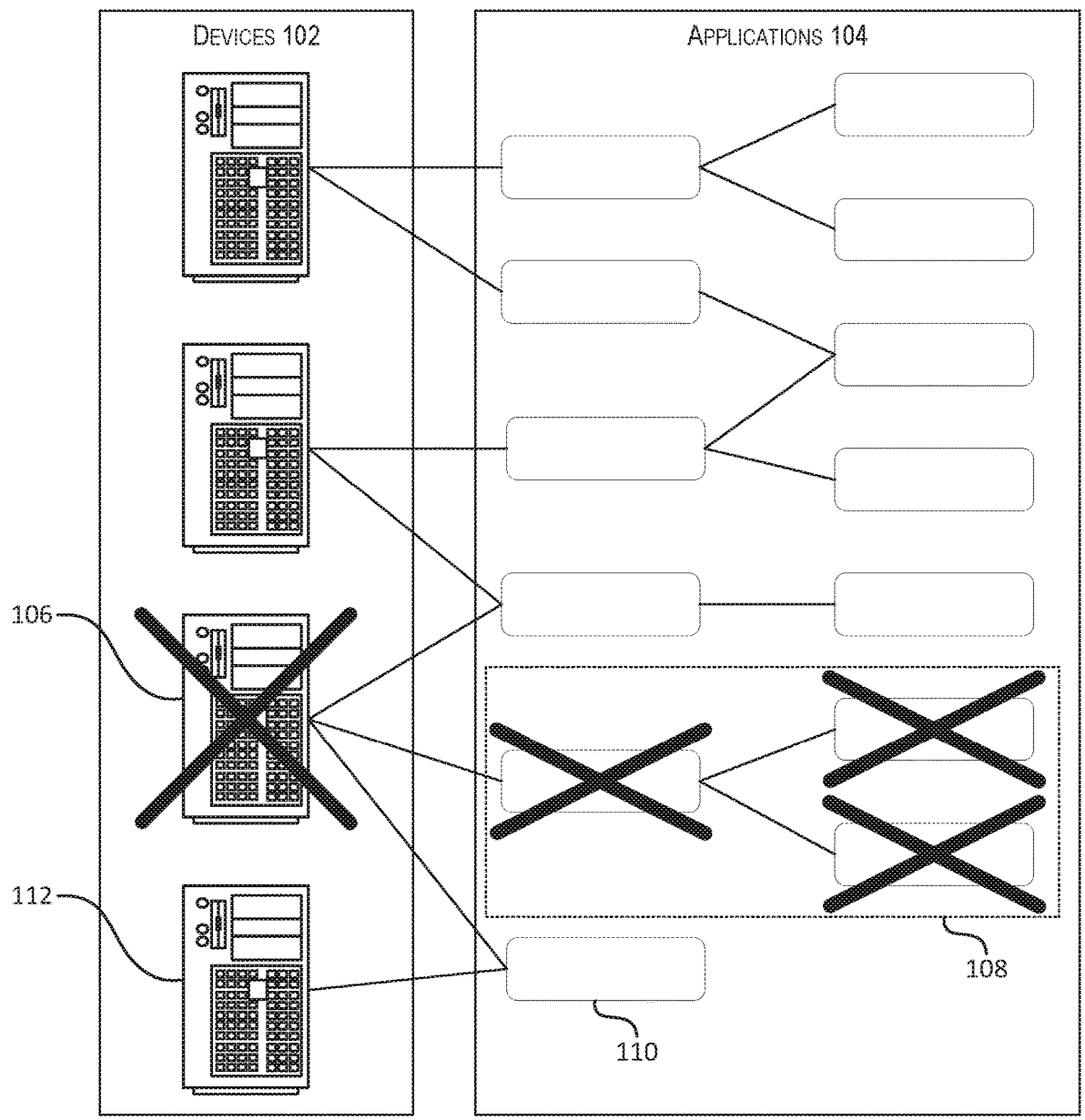
FIG. 1 depicts an illustrative example of a network topology that may be generated such that a device's impact on the network may be quickly determined.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to systems, methods, apparatuses, and computer readable media for generating a network topology for a network based on dependencies between network components (e.g., network applications and network devices) within the network. In some embodiments, a network topology may be generated by monitoring transactions between various network components within the network. A transaction may comprise any suitable indication of an interaction between two or more network components. For example, the system may assess data logs and configuration files to identify transactions received by, or originating from, the network component associated with the data log. Once transactions have been detected, IP addresses associated with those transactions may be mapped to an originating network component as well as a receiving network component. A network topology may then be generated that reflects each of the detected dependencies.

In some embodiments, an impact score may be generated for at least some of the network components within the network based on the generated network topology. For example, an administrator or user may initially assign an impact score to one or more network components. Embodiments of the disclosure may then calculate impact scores for various other network components based on detected dependencies. In some embodiments, the network topology and/or impact scores may be used to make determinations that affect the network. For example, a decision on whether to make an update to a particular network component may be made based on an impact score associated with that network component. In some embodiments, updates may be made automatically (e.g., without user interaction) to network components that have an impact score below a threshold impact score value. For example, the system may determine that a software update is available for installation on a number of network devices. In this example, the software update may be automatically deployed to those network devices that have a lower impact on the network, whereas the software update may be deployed to those network devices that have a higher impact on the network only upon receiving administrator approval. This would allow an administrator to identify any potential issues caused by the software update without putting the network at risk.

Prior to discussing embodiments of the invention, description of some terms may be helpful in understanding embodiments of the invention.

A "distributed computing system" may be any set of computing devices that interact with each other in order to achieve a common goal. In some embodiments, a distributed computing system may comprise a set of networked computing devices that communicate and coordinate their actions by sending communications throughout the network. In some embodiments, network applications running on a distributed computing system may be run on a number of different server devices.

An "endpoint" may include any suitable termination (origin or destination) for a communication. In some cases, an endpoint may be an address such as an IP address.

An "impact score" may be any indication of a network component's impact on a network. In some embodiments, an impact score may be generated for a particular network component based on impact scores associated with network components that depend upon that particular network component. In some embodiments, an impact score may be represented by a numerical value. In some embodiments, the system described herein may be configured to make one or more determinations with respect to a network component based on an impact score associated with that network component. For example, the system may deactivate all network devices that have an impact score below a threshold impact score value.

A "network application" may be any set of instructions configured to cause one or more processors to execute a specified function within a network. In some embodiments, a network application may be installed on, and executed from, a number of different computing devices within a network. Execution of various network applications may be initiated either by a user or automatically (e.g., without user interaction), such as on a timed or periodic basis. In some embodiments, a network application may comprise a distributed application or service. For example, the network application may comprise an application or service that is implemented across a distributed computing environment.

A "network device" may be any electronic device that provides access to a resource or function. Some non-limiting examples of potential network devices may include network gateways, routers, network bridges, modems, network switches, network hubs, repeaters, or any other suitable devices. In some embodiments, the network device may comprise a combination of hardware and software configured to provide access to a resource or function. In some embodiments, the network device may comprise a computing device that has access to a resource (e.g., stored in memory). For example, a network device may comprise a database server that may be used to obtain information from a database.

A "network topology" may be any indication of one or more relationships between various network components. In some embodiments, the network topology may comprise a logical topology, which illustrates how data flows within a network, regardless of its physical design. In some embodiments, the network topology may indicate various dependencies between different network components. Dependencies indicated in this manner may be related to network applications and/or network devices. In some embodiments, a network topology may be stored as one or more database tables using a database management system.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first network component requesting resources from a second network component. In this example, the transaction is completed when the resources are either provided to the first network component or the transaction is declined.

Details of some embodiments of the present invention will now be described.

FIG. 1 depicts an illustrative example of a network topology that may be generated such that a device's impact on the network may be quickly determined. The network topology depicted includes mappings between not only network devices, but also network applications. In FIG. 1, a number of network devices 102 may be in communication with a number of network applications 104. In some embodiments, the network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

A network device may be included in a network or may be external to the network. In some embodiments, a resource or function managed by the network device may be requested by a network application. For example, an application may require access to an internet protocol (IP) address located outside of a network within which the application has been executed. In this example, the application may request access to a network gateway and/or a firewall device or proxy server in order to securely communicate with a computing device at the IP address.

In some embodiments, a network application may be installed on a number of servers throughout a distributed computing environment. In some embodiments, network applications may be installed upon, and executed from, a dedicated server (or other computing device). In some embodiments, multiple network applications may be installed on a single server.

In accordance with embodiments of the disclosure, transactions between various network applications and network devices may be monitored. To generate a network topology, the system may note IP addresses from which communications transmitted within the network originate and IP addresses to which those communications are routed. The system may then map each noted IP address to a network device or network application. To map a communication to a network application, the system may identify a server associated with the IP address and determine the application running on that server related to the communication.

Once a network topology has been generated, a network component's impact on the network may be determined. For example, in the network topology illustrated in FIG. 1, an update (e.g., a deactivation) to network device 106 may be determined to impact a number of network applications 108 based on the topology. In this example, the system may also determine the impact of an update to the network for each network device 102 based on a number of other network devices in the network that provide access to the same resource or function as the network device. For example, although additional applications (e.g., application 110) may be impacted by an update to network device 106, the impact may be reduced if the application is in communication with a network device 112 that provides access to the same resource or function as the network device 106. In some embodiments, each application and/or device may be assigned an impact score based on its necessity to the network as a whole. The system may calculate an impact score for a network device or network application based on its impact to other network devices/network applications and their respective impact scores.

An impact score for a network component may be used by the system in a number of ways. For example, upon determining that there are insufficient resources to maintain the entirety of the network components (e.g., in the event of a power outage or power shortage), the system may determine that at least some network components should be powered down so that the remaining network components may be maintained. In this example, the system may identify the network components with the lowest impact on the network as a whole to be powered down. This may be repeated a number of times until an amount of resource necessary to maintain the remaining network components is less than the amount of that resource available. In another example, upon determining that a network is being underutilized (e.g., there is more bandwidth available than is being used), the system may determine that one or more network components may be deactivated (at least temporarily) in order to reduce costs of operating the network. In this example, the system may continue to deactivate the network component with the lowest impact score until the network is being optimally utilized.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
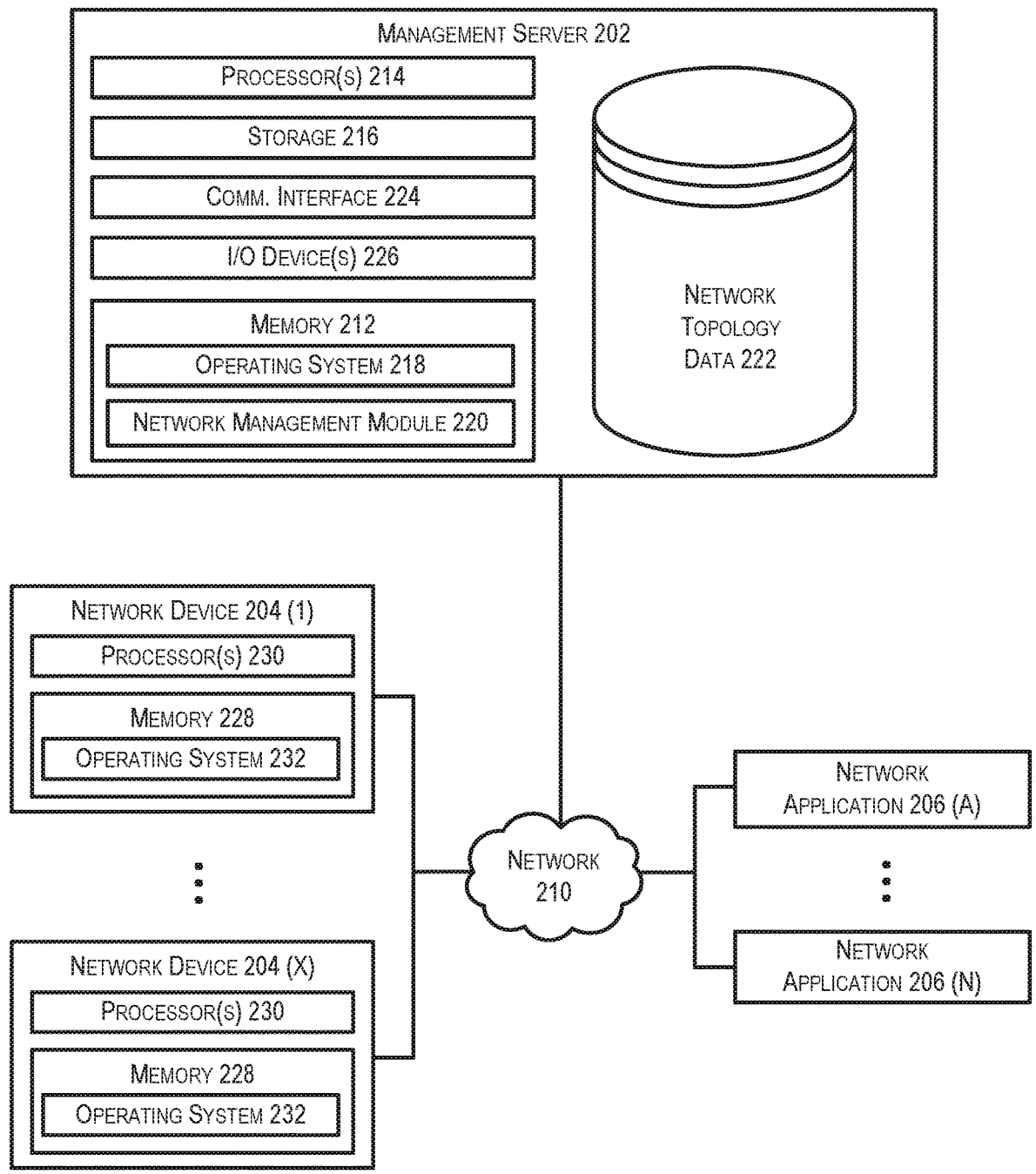
FIG. 2 depicts an illustrative example of an exemplary management server that may be configured to generate a network topology in accordance with at least some embodiments.

FIG. 2 depicts an illustrative example of an exemplary management server 202 that may be configured to generate a network topology in accordance with at least some embodiments. In accordance with at least some embodiments, the management server 202 may be in communication with a number of network devices 204 (1-X) and a number of network applications 206 (A-N). In some embodiments, each of these described components may be in communication via a network 210.

The management server 202 may be any type of computing device capable of generating a network topology and/or determining an impact score in accordance with embodiments of the disclosure. In at least some embodiments, the management server 202 may include at least one memory 212 and one or more processing units (or processor(s)) 214. The processor(s) 214 may be implemented as appropriate in hardware, computer-executable instructions, firmware or combinations thereof. Computer-executable instruction or firmware embodiments of the processor(s) 214 may include computer-executable or machine executable instructions written in any suitable programming language to perform the various functions described.

The memory 212 may store program instructions that are loadable and executable on the processor(s) 214, as well as data generated during the execution of these programs. Depending on the configuration and type of management server 202, the memory 212 may be volatile (such as random access memory (RAM)) and/or non-volatile (such as read-only memory (ROM), flash memory, etc.). The management server 202 may also include additional storage 216, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the management server 202. In some embodiments, the memory 212 may include multiple different types of memory, such as static random access memory (SRAM), dynamic random access memory (DRAM) or ROM.

Turning to the contents of the memory 212 in more detail, the memory 212 may include an operating system 218 and one or more application programs or services for implementing the features disclosed herein including at least a module for generating a topology for a network and/or determining an impact score for a network device or network application (network management module 220). The memory 212 may also include network topology data 222, which provides data associated with network device/network application relationships.

In some embodiments, the network management module 210 may, in conjunction with the processor 204, be configured to monitor transactions between various network devices and/or network applications and to generate a network topology based on those transactions. In some embodiments, transactions may be associated with communications routed from a first network component to a second network component. Embodiments of the disclosure may comprise identifying IP addresses from which each communication originates as well as IP addresses to which each communication is routed. Identified IP addresses are mapped to their respective network devices. To map the IP address to an application, the applications running on a server device at the IP address may be identified. In some embodiments, the network management module 210 may, in conjunction with the processor 214, be further configured to determine an impact score for a network application or a network device based on the generated network topology. This may comprise determining a criticality of at least some network applications to the network. An impact score may then be generated for a network device/application based on dependencies between the network device/application and various other network applications (e.g., applications that are indicated as being impacted via the network topology). This is described in greater detail below.

The management server 202 may also contain communications interface(s) 224 that enable the management server 202 to communicate with a stored database, another computing device or server, one or more remote devices, other application servers, and/or any other suitable electronic devices. In some embodiments, the communication interface 224 may enable the management server 202 to communicate with other electronic devices on a network 210 (e.g., on a private network). The management server 202 may also include input/output (I/O) device(s) and/or ports 226, such as for enabling connection with a keyboard, a mouse, a pen, a voice input device, a touch input device, a display, speakers, a printer, etc.

The management server 202 may be in communication with a number of network devices 204 (1-X). Each network device may include a memory 228 (e.g., a computer-readable storage medium) storing instructions that, when executed by a processor 230 of the network device, allow the network device to perform its intended functions and typically will include an operating system 232 that provides executable program instructions for the general administration and operation of that network device. Suitable implementations for the operating system and general functionality of various network devices 204 (1-X) are known or commercially available and are readily implemented by persons having ordinary skill in the art, particularly in light of the disclosure herein.

Similar to the memory 212 of the management server 202, the memory 228 may include an operating system and a number of applications. In accordance with embodiments of the disclosure, each network device of the network devices 204 (1-X) may execute a separate set of applications and/or provide access to a separate set of resources. For example, a first network device may comprise a firewall device whereas a second network device may comprise a database server. In this example, the first network device may include software configured to block network communications that meet specified conditions whereas the second network device may include software configured to perform database functions.

The management server 202 may be in communication with a number of network applications 206 (A-N). Network applications 206 may be executed in order to perform some service with respect to the network 210. In some embodiments, a network application may comprise a distributed program running on a distributed computing system (e.g., a cloud computing system). In such systems, a single application may be instantiated on a number of servers distributed throughout a network. Multiple instances of each network application may be executed at any given time.

Figure 3:
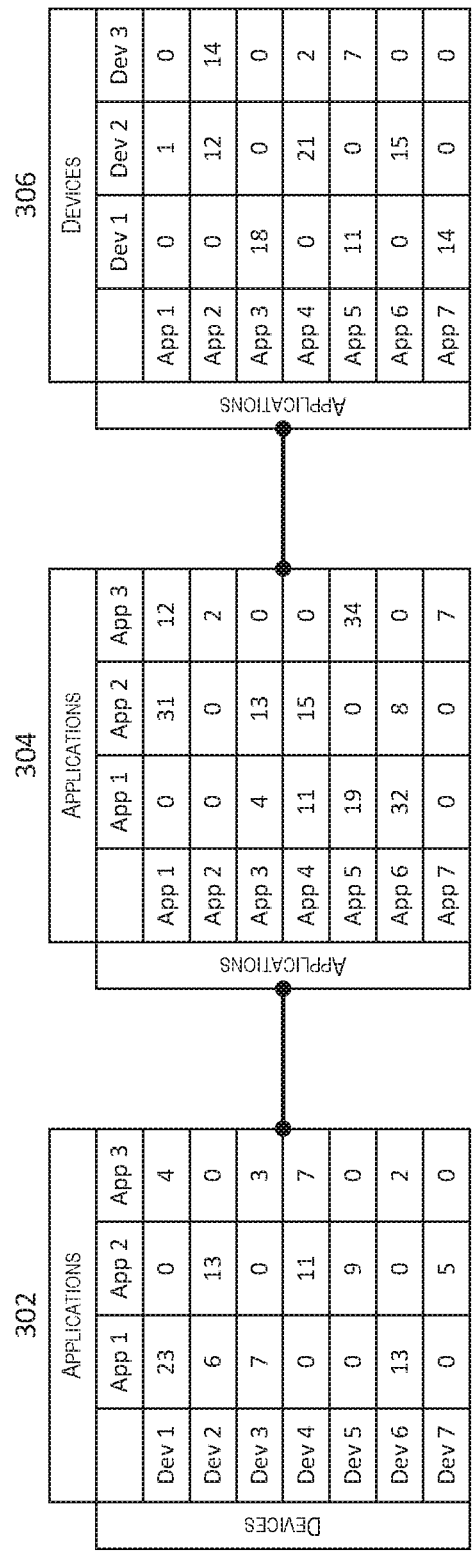
FIG. 3 depicts an illustrative example of a network topology that may be generated in accordance with embodiments of the disclosure.

FIG. 3 depicts an illustrative example of a network topology that may be generated in accordance with embodiments of the disclosure. FIG. 3 is depicted as portions of a number of database tables 302, 304, and 306. In some embodiments, the network topology may be stored in any suitable type of database system (e.g., a relational database system).

In accordance with at least some embodiments, database tables may include indications of interactions between two network components. In some embodiments, a data field associated with two network components (e.g., network applications and/or network devices) may include a value that represents a number of interactions that have occurred between the two network components within a predetermined period of time (e.g., within the last 30 days). In some embodiments, these data fields may be updated dynamically as new information is obtained (e.g., new interactions occur).

In accordance with at least some embodiments, rows and columns of a database table may be used to represent different things. For example, in some embodiments, rows of a database table may represent a network component to which a communication (related to a transaction) was routed whereas columns of that same database table may represent network components from which the communication originated. In this example, data field at a specific row may be populated with a value that represents the number of transactions conducted by the network component associated with the column to the network component associated with the row during the last 30 days.

In some embodiments, multiple database tables may be used to represent a single network topology. For example, in FIG. 3, three separate database tables are used to represent a network topology. In this example, table 302 may represent network application initiated interactions with various network devices, table 304 may represent interactions between various network applications, and table 306 may represent network device initiated transactions with various network applications. Communications routed within the network may be monitored by a management server. IP addresses associated with both a sender and receiver of each message may be mapped to specific network components. An indication of each message may then be recorded in its respective database table. Additionally, information in the database table may be removed as it exceeds a predetermined age.

It should be noted that although a number of database tables (302, 304, and 306) are depicted in FIG. 3, the network topology may instead be stored in a single database in some embodiments. For example, indications of interactions between various network components (both network applications and network devices) may be stored in a single database. In some embodiments, positive and negative values may be used to represent a dependency (e.g., represented by the direction of a communication). For example, a value of 23 stored in a field associated with a row having Application A and a column having Application B may indicate that 23 messages have been passed from Application B to Application A, whereas a value of −23 may indicate that 23 messages have been passed from Application A to Application B.

In accordance with at least some embodiments, the network topology may be used to identify dependencies between various network components. For example, the system may identify a dependency as existing between two components when a value in a corresponding data field is above a predetermined threshold value. In other words, a dependency may exist between two network components when a large enough number of transactions have transpired between the two network components. A dependency may be identified such that a network component from which communications related to a transaction originate is dependent upon a network component to which those communications are routed. In other words, in the example given above, the network component associated with the column of a data field depends upon the network component associated with the row of that data field.

To evaluate an impact that a particular network component has on the network as a whole, the system may identify all of the network components that depend upon that particular network component. The system may then identify all of the network components that depend upon those network components. This may be repeated until a complete mapping of dependencies has been created in relation to a particular network component. For example, upon selecting a particular network device for which to determine an impact on the network, the system may identify a number of network applications that depend on that network device from table 302. In this example, the system may then identify each of the network applications identified in the previous step from database table 304. This step may be repeated until no additional network applications can be identified. Continuing with the example, the system may identify any network devices that depend on the network applications identified in the previous steps from database table 306. In this manner, the system can identify each of the network components that are dependent upon a particular network component. In some embodiments, a number of network components may be assigned an impact score (representing a criticality or level of importance). An impact score may be calculated for a particular network component based on impact scores associated with each of the network components that depend upon that particular network component.

Figure 4:
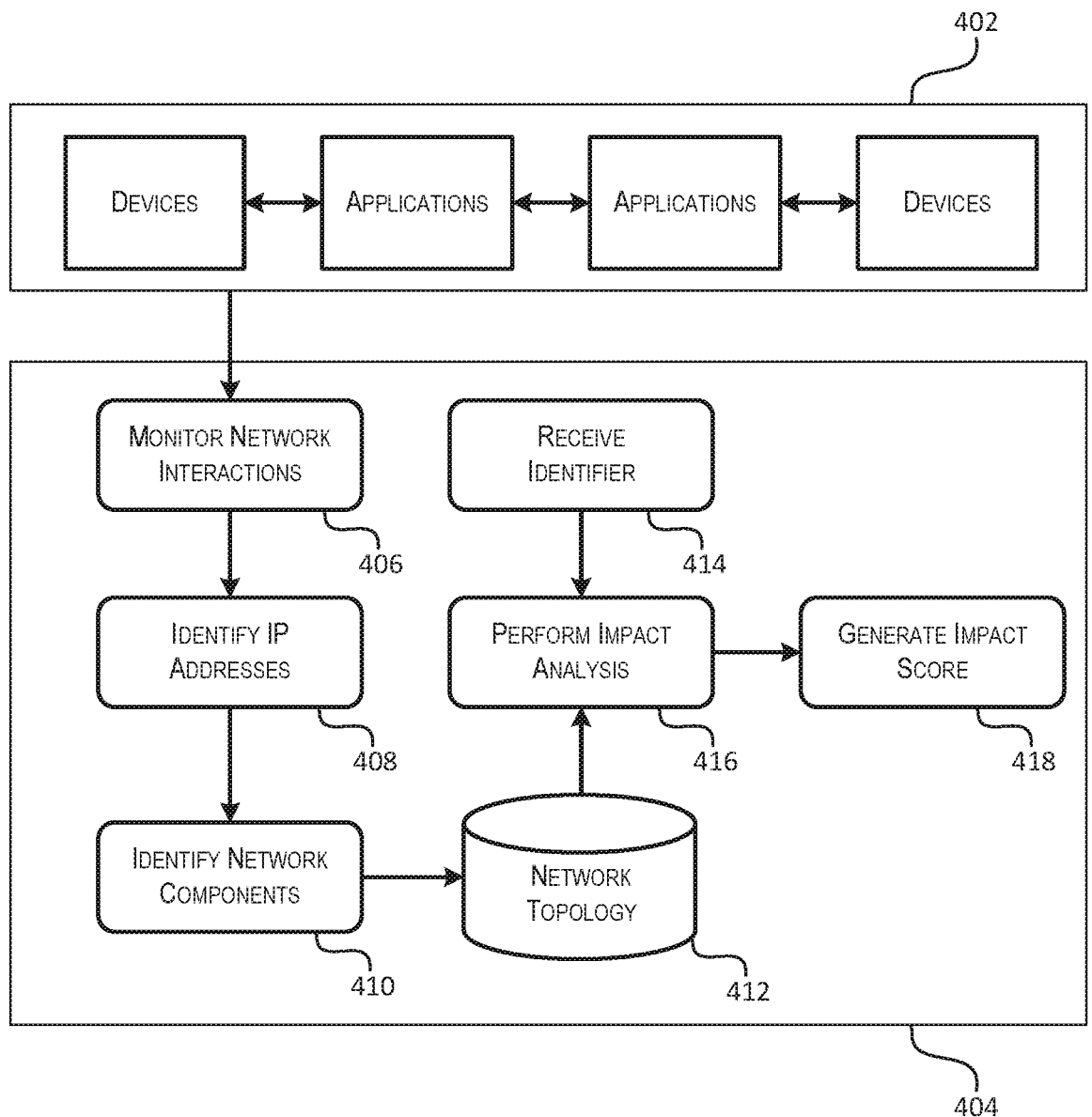
FIG. 4 depicts an flow chart illustrating a process for generating a network topology and determining an impact score for a particular network component based on the generated network topology.

FIG. 4 depicts an flow chart illustrating a process for generating a network topology and determining an impact score for a particular network component based on the generated network topology. In FIG. 4, a network 402 may comprise a number of network components, including both network devices and network applications. A management server 404 may be communication with the network 402. In some embodiments, management server 404 may be an example management server 202 depicted in FIG. 2.

In accordance with embodiments of the disclosure, the management server 404 may monitor network interactions between various network components of the network 402 at 406. In some embodiments, the management server 404 may retrieve various logs and configuration files to identify these transactions. For example, the management server 404 may assess firewall logs to identify transactions between network components.

As communications related to transactions are detected, the management server 404 may determine an IP address to which that communication is directed as well as an IP address from which the communication originated at 408. The management server 404 may subsequently identify network components associated with each of the IP addresses identified in the previous step at 410. In some embodiments, the IP address may be assigned to a server or host on which one or more network applications are running. In this scenario, the system may retrieve a server log from the server to determine which network application a communication originated from.

Indications may be stored with respect to each of the identified transactions as network topology data at 412. For example, as depicted in FIG. 3, a data field value associated with two network components may be incremented each time that a transaction is detected between those two components. In some embodiments, only recent transactions may be reflected in the network topology, which serves to automatically (e.g., without user interaction) update the topology of the network as the structure of the network is updated. For example, a set of master tables may be updated to reflect each transaction detected between various network components. In this example, a network topology may be generated by comparing a current version of the set of master tables to a version of the set of master tables from a previous date (e.g., a snapshot). In this way, the network topology may be made to reflect a difference between the two versions of the set of master tables. In some embodiments, each transaction between network components may be associated with a date and/or time.

Once a network topology has been generated, the management server 404 may determine an impact that an update to a particular network component will have on the network as a whole based on the generated network topology. In some embodiments, this may be initiated at 414 when the management server 404 receives a request that includes an identifier for the network component. The management server 404, upon receiving this request, may initiate an impact analysis at 416.

To perform an impact analysis for a particular network component, the management server 404 may identify all of the network components that depend upon that particular network component. The management server 404 may then identify all of the network components that depend upon each of those identified network components. In some embodiments, to determine whether a dependency exists with respect to two network components, the system may determine whether a data value associated with both of those network components is above a threshold value. This may be repeated until a complete mapping of dependencies has been created in relation to the particular network component. The management server 404 may then identify any network devices that depend on the network applications that were identified in the previous steps.

In some embodiments, at least some of the network components in a network may be assigned an impact score. Initially, an impact score for at least some network components of the network may be assigned by a system administrator or other user. For example, the system administrator may identify a number of mission critical network components. Each of these mission critical network components may be assigned the highest impact score possible. During an impact analysis, an impact score may be determined at 418 for a network component that has not previously been assigned an impact score based on impact scores associated with each of the network components that depend upon that network component. This is described in greater detail below with respect to FIG. 5.

Figure 5:
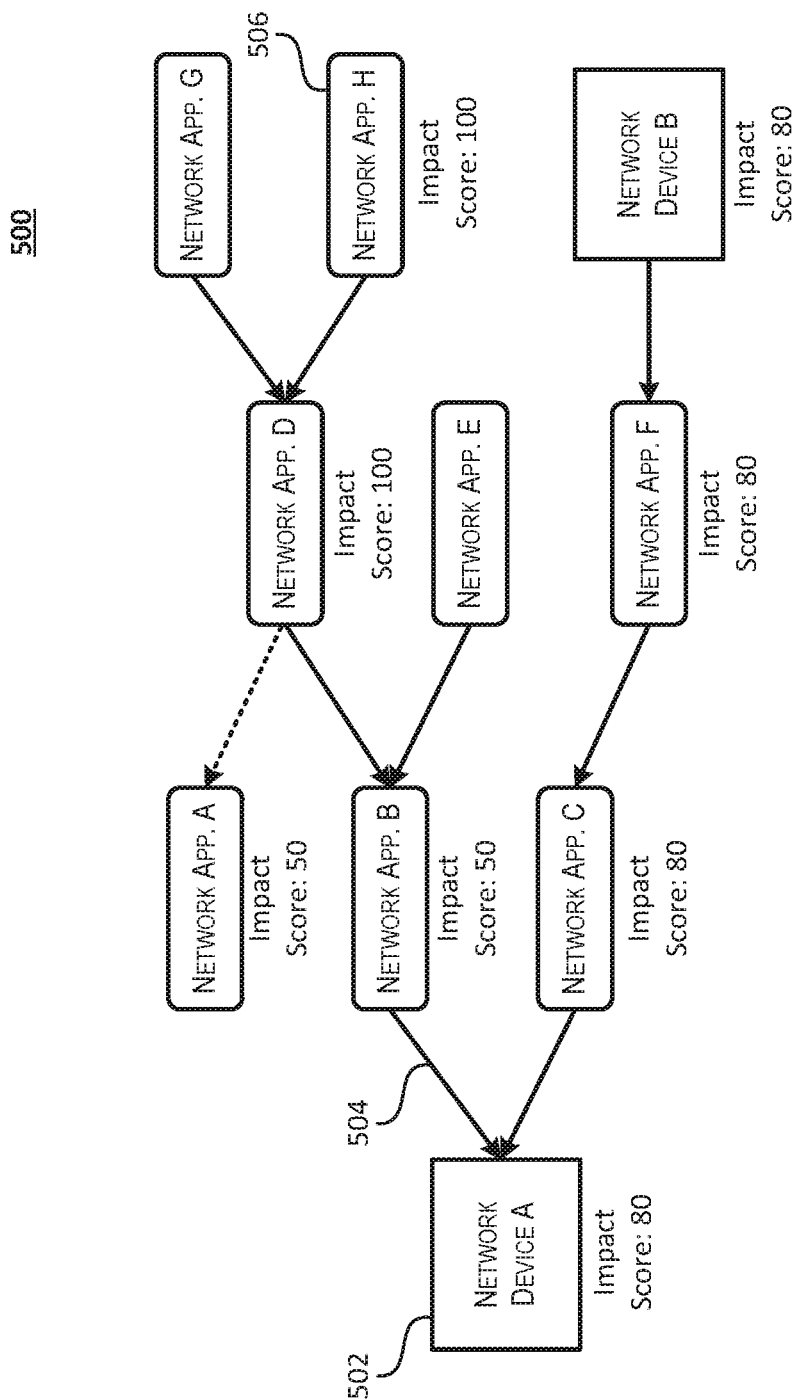
FIG. 5 depicts a process for generating an impact score for a network component in accordance with at least some embodiments.

FIG. 5 depicts a process for generating an impact score for a network component in accordance with at least some embodiments. FIG. 5, a number of application dependencies have been identified with respect to network device A (depicted at 502). Additionally, a number of dependencies are depicted by arrows (e.g., 504) in the diagram. For example, as depicted in the diagram, Network Application B and Network Application C both depend upon Network Device A. Network Application D and Network Application E both depend upon Network Application B. Network Application G and Network Application H both depend upon Network Application D. Network Device B depends upon Network Application F, which further depends upon Network Application C.

Initially, an impact score may be assigned to a number of network components within a network. In some embodiments, this may be done by an administrator or other user. For example, Network Application H (506) may initially be assigned an impact score of 100 (out of 100) to indicate that it is a mission critical network component. Additionally, Network Device B may initially be assigned an impact score of 80. In this example, because Network Application H depends upon Network Application D, it may be determined that Network Application D is also to be assigned an impact score of 100. In some embodiments, an impact score may be weighted, or otherwise adjusted, based on a number of transactions stored in relation to a dependency.

An impact score may be calculated for each network component based on the network components upon the network components that depend upon it as well as the number of other network components that provide the same functionality or serves the same purpose as the network component being evaluated. For example, Network Application D depends upon Network Application B in the depicted example and has an impact score of 100. However, Network Application D also depends upon Network Application A. If Network Application A provides the same functionality or serves the same purpose as Network Application B, then the impact score of both Network Application A and Network Application B may be determined to be lower than the impact score of Network Application D (as neither network component is as critical). In some embodiments, bandwidth of a particular network component (i.e., the amount of requests that may be processed by that particular network component) may be used to adjust the impact score assigned to that network component. For example, if a set of data fields indicating dependency upon a network component in the network topology have a sum that is significantly less than the bandwidth of that network component, then the impact score for that network component may be adjusted downward as the network component is being underutilized. For example, if a network device has a bandwidth that enables it to handle to 50 requests per minute, and the network topology indicates that it has handled 32 requests in the last day, then the impact score for that network device may be adjusted downward. On the other hand, if there are two similar network devices (e.g., those that provide the same functionality or serve the same purpose) that each have a bandwidth that enable them to handle to 50 requests per minute, and the network topology indicates that and average of 70 requests have been received per minute over the last day, then the impact score for that network device may be adjusted upward as the loss of one of the devices would result in the second device being unable to handle the amount of requests received.

In some embodiments, multiple network components may depend upon a single network component. For example, in the depicted diagram, both Network Application B and Network Application C depend upon Network Device A. In some embodiments, a network component may be assigned the highest impact score assigned to network components that depend upon that network component. For example, if Network Application B has been assigned an impact score of 50 and Network Application C has been assigned an impact score of 80, then Network Device A may be assigned an impact score of 80. In some embodiments, a network component's impact score may be adjusted based upon the number of other network components that depend upon that network component. For example, if a large number of network components depend upon a particular network component, then an impact score associated with that particular network component may be adjusted upward.

Figure 6:
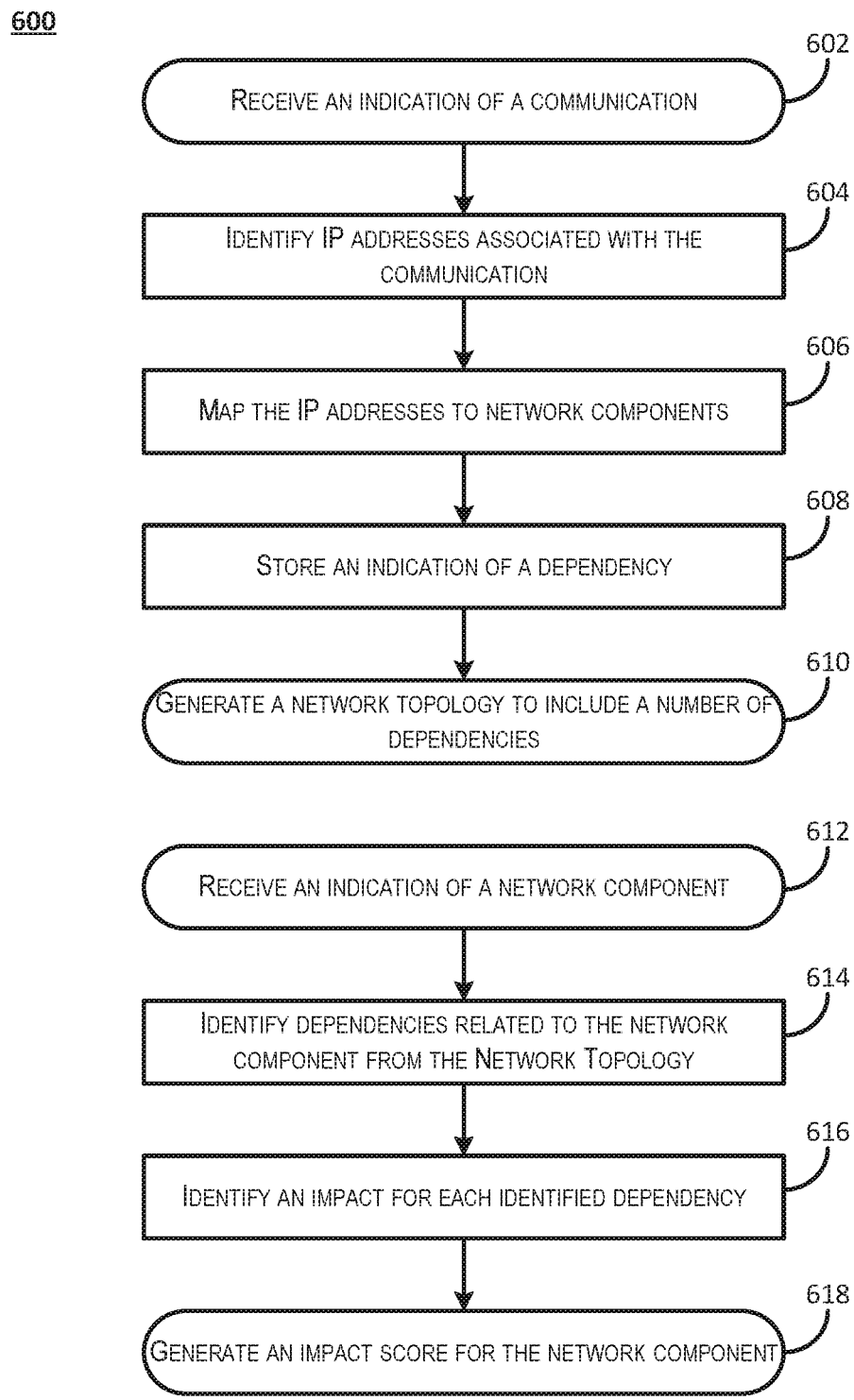
FIG. 6 depicts a flow diagram that illustrates a process for generating a network topology and determining an impact score for a particular network component based on that network topology.

FIG. 6 depicts a flow diagram that illustrates a process for generating a network topology and determining an impact score for a particular network component based on that network topology. Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more management servers 202 depicted in FIG. 2. The code may be stored on a computer-readable storage medium, for example, in the form of a computer program including a plurality of instructions executable by one or more processors. The computer-readable storage medium may be non-transitory.

In at least some embodiments, process 600 may begin at 602, when an indication of a transaction is received by the management server. In some embodiments, a transaction may be indicated via a communication sent from a first network component to a second network component. In some embodiments, transactions may be identified from data logs maintained by a number of network devices.

At 604, the management server may identify one or more endpoints (e.g., IP addresses) associated with the identified transaction. For example, the transaction may be associated with an origination endpoint from which a request to conduct the transaction was received.

At 606, the identified endpoints may be mapped to specific network components. For example, a management server may query a server at the identified endpoint to request information related to the transaction. The server may respond to this request with an identifier of a network application running on the server.

At 608, the management server may store an indication of a dependency in relation to the determined network components. In some embodiments, the management server may increment a counter or data field value for each transaction identified with respect to the relevant network components. In some embodiments, the network component associated with an origination endpoint may be determined to be dependent upon a network component associated with a receiving endpoint.

At 610, a network topology may be generated based on a number of dependencies stored in the manner described. In some embodiments, a network topology may comprise a number of records of transactions between various network components stored in a data store. For example, the network topology may comprise a number of data fields stored in database tables.

At 612, the management server may receive an indication of a network component for which an impact analysis process is to be performed. In some embodiments, this may comprise a request submitted by a user (e.g., an administrator). In some embodiments, an impact analysis may be performed automatically (e.g., on a periodic basis). For example, an impact analysis may be performed for a number of network components on a daily basis. Requests submitted by a user may include a network component identifier.

At 614, a number of dependent network components may be identified in relation to the specified network component.

The number of dependent network components may be identified based on recorded transactions between various network components. In some embodiments, to be considered dependent upon a network component, another network component must have conducted a number of transactions with that network component. For example, only network components that have conducted a number of transactions greater than a threshold number with the specified network component may be considered dependent upon the specified network component.

At 616, an impact score may be identified for each of the dependent network components. In some embodiments, the dependent network component may have been assigned an impact score by an administrator. In some embodiments, an impact analysis process may have been performed with respect to the dependent network component in order to determine an impact score for that network component. In some embodiments, an impact analysis process may be recursively performed for each dependent network component identified in the previously described manner.

At 618, an impact score may be generated for the specified network component based on the impact scores associated with each of the dependent network components. The impact score for the network component may be determined based on the impact scores assigned to each of the network components that depend upon the specified network component. In some embodiments, the impact score may be determined as a maximum, or highest, value of the impact scores assigned to each of the network components that depend upon the specified network component. In some embodiments, the impact score may be determined using a function influenced by a number of factors. For example, the impact score may be influenced by the number of other network components that depend upon the specified network component, a number of transactions that have been conducted by the specified component, a bandwidth of the specified network component, or any other suitable factor.

Embodiments of the invention provide for a number of technical advantages. For example, embodiments of the invention enable users, such as network administrators, to quickly ascertain the impact that an update to a particular network component will have on the network as a whole. Additionally, unlike conventional network topologies, in which only device-to-device dependencies are identified, the current disclosure enables identification of application-to-device dependencies. This is useful in a number of environments in which a single application may run on a number of different devices (e.g., a distributed computing environment). Accordingly, embodiments of the current disclosure enable identification of a business-level impact that an update to a particular network component will have on the network.

It should be understood that any of the embodiments of the present invention can be implemented in the form of control logic using hardware (e.g. an application specific integrated circuit (ASIC) or field programmable gate array (FPGA)) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of generating a network topology comprising:
   receiving, for each network device of a plurality of network devices associated with a network, an indication of one or more transactions between the network device and a plurality of endpoints;
   mapping each endpoint of the plurality of endpoints to a network application of a plurality of network applications, each network application of the plurality of network applications associated with an application impact score;
   storing information indicating a relationship between each network device of the plurality of network devices and one or more network applications of the plurality of network applications based on the mappings;
   generating the network topology based on the stored information; and determining a device impact score for each network device of the plurality of network devices based on the generated network topology and the application impact scores.

2. The method of claim 1, wherein the device impact score is also weighted based on a number of transactions between the network device and each endpoint.

3. The method of claim 1 further comprising:
obtaining a second indication of transactions conducted between different endpoints of the plurality of endpoints; and
updating the stored information based on the second indication.

4. The method of claim 1 wherein the indication of one or more transactions between the network device and the plurality of endpoints includes an originator of the one or more transactions.

5. The method of claim 1 wherein each endpoint comprises an internet protocol (IP) address.

6. The method of claim 1 wherein the plurality of network applications comprise distributed programs installed on a set of network servers within the network.

7. The method of claim 6 wherein the set of network servers comprises a distributed computing system.

8. The method of claim 1 further comprising performing at least one action with respect to a number of network devices of the plurality of network devices based at least in part on the device impact scores associated with the number of network devices.

9. The method of claim 8 wherein performing the at least one action with respect to a number of network devices comprises deactivating the number of network devices.

10. The method of claim 1 wherein the device impact score for each network device of the plurality of network devices represents a level of criticality of each network device of the plurality of network devices.

11. A server apparatus comprising:
one or more processors; and
a memory including instructions that, when executed by the one or more processors, cause the server apparatus to:
receive, for each device of a plurality of devices involved in a network, an indication of at least one communication between the device and a plurality of endpoints;
map each endpoint of the plurality of endpoints to an application of a plurality of applications, each application of the plurality of applications associated with an application impact score;
store information indicating a relationship between each device and one or more applications based on the mappings;
generate a network topology based on the stored information; and
determine a device impact score for each device of the plurality of devices based on the generated network topology and the application impact scores.

12. The server apparatus of claim 11, wherein the application impact score for each application of the plurality of applications represents a level of criticality of each application of the plurality of applications.

13. The server apparatus of claim 11, wherein the network topology comprises a number of data fields stored in database tables.

14. The server apparatus of claim 13 wherein the number of data fields are populated with values that reflect a number of transactions conducted between two network components.

15. The server apparatus of claim 13 wherein at least one of rows or columns of the database tables represents an originating network component and the other of the rows or columns of the database tables represents a receiving network component.

16. The server apparatus of claim 11, wherein the device impact score is determined for each device of the plurality of devices on a periodic basis.

17. The server apparatus of claim 11, wherein the device impact score is determined for each device of the plurality of devices upon receiving a request from a user.

* * * * *